United States Patent [19]
Rees

[11] 3,910,740
[45] Oct. 7, 1975

[54] EJECTION-CONTROL SYSTEM FOR INJECTION-MOLDING MACHINE

[75] Inventor: Herbert Rees, Willowdale, Canada

[73] Assignee: Husky Injection Molding Systems, Bolton, Canada

[22] Filed: Mar. 27, 1974

[21] Appl. No.: 455,318

[52] U.S. Cl. ............. 425/242 R; 164/269; 425/437; 425/455 R
[51] Int. Cl.² ......................................... B29F 1/14
[58] Field of Search ........ 425/437, 444, 455 R, 441, 425/242 R; 164/269, 347

[56] References Cited
UNITED STATES PATENTS

| | | | |
|---|---|---|---|
| 1,985,893 | 1/1935 | Goodrich et al. | 164/269 |
| 3,081,486 | 3/1963 | Skvorc | 164/347 X |
| 3,805,875 | 4/1974 | Daugherty et al. | 425/444 X |

FOREIGN PATENTS OR APPLICATIONS

| | | | |
|---|---|---|---|
| 1,423,889 | 11/1965 | France | 425/441 |

*Primary Examiner*—Robert D. Baldwin
*Attorney, Agent, or Firm*—Karl F. Ross; Herbert Dubno

[57] ABSTRACT

A movable mold portion, provided with an array of mold cores and a stripper plate, carries one or more pairs of vertical guide rails bracketing the several mold cores and forming tracks for the guidance of molded articles detached from the cores by the stripper plate. The rails are transversely movable by a control mechanism which separates them during a mold-closing stroke and drives them toward each other, close to the associated mold cores, during a mold-opening stroke. The control mechanism may include a pair of cam plates on the other mold portion, or an actuator on the same mold portion connected with the rails through a parallelogrammatic linkage. The descent of the ejected articles along the rails may be accelerated by an overhead blower.

9 Claims, 9 Drawing Figures

EJECTION-CONTROL SYSTEM FOR INJECTION-MOLDING MACHINE

FIELD OF THE INVENTION

My present invention relates to a system for guiding molded articles discharged from one or more mold cavities of an injection-molding machine.

BACKGROUND OF THE INVENTION

With the development of high-speed molding machines and increasingly efficient ejection means, the task of orienting the molded articles for subsequent handling has heretofore been largely performed by hand. The articles, removed from the mold by ejection means such as a stripper plate or knockout pins, usually drop freely onto a conveyor belt or directly into a storage bin with a random orientation necessitating their manual sorting.

OBJECTS OF THE INVENTION

The general object of my invention is to provide, in an injection-molding machine, simple means for positively guiding molded articles onto a conveyor or other receiving surface without impeding the molding function of the machine.

A more particular object of the invention is to provide means of this nature enabling the articles to leave the molding zone primarily or exclusively under their own weight, with little or no expenditure of energy supplementing the force of gravity.

These objects are realized, pursuant to my present invention, by the provision of track-forming means on a first mold portion defining one or more cavities with a coacting second mold portion, the two mold portions being relatively reciprocable by conventional drive means between a mold-open and a mold-closed position. A control mechanism synchronized with the mold drive moves the track-forming means, extending downwardly from the vicinity of the cavity or cavities, into an operative position during a mold-opening stroke for the purpose of intercepting a molded article discharged from each cavity and guiding same downwardly with essentially the orientation it had in the mold. During the mold-closing stroke, the control mechanism retracts the track-forming means to facilitate the molding of another article in each cavity.

According to a more specific feature of my invention, the track-forming means comprises a pair of generally vertical rails bracketing an associated mold cavity or a set of vertically aligned cavities, these rails being transversely shiftable apart from each other upon retraction and toward each other upon operative displacement. Such shifting can be accomplished with the air of a coupling between the rails and the second mold portion, preferably a member such as a cam plate on the latter mold portion provided with a pair of camming edges which are engaged by respective cam followers each linked to one of the rails. If the mold cavities are arrayed in two parallel columns, two pairs of rails forming respective guide tracks for these columns may be jointly controlled by the same camming mechanism whose two cam followers are each linked to a rail of each track.

The lateral movement of the rails could also be controlled by an actuator, e.g. a fluid-operable jack or a solenoid, mounted on the same mold portion as the rails and connected to them via a linkage ensuring their simultaneous and symmetrical displacement. In the case of a multiple mold, such a linkage may comprise a set of annular elements (i.e. rings or ring segments) rotatably mounted on that mold portion and respectively surrounding the several cavities thereof, the rails of each pair being pivoted to the annular elements of the associated cavities at diametrically opposite points. A simplified system of this character comprises a pair of parallelogrammatic linkages, with the rails constituting parallel links thereof.

If the mold portion carrying the track-forming means is a male mold half provided with one or more cores bracketed by the rails, the latter may be movably mounted on an apertured stripper plate which is supported on that mold half and is shiftable relatively thereto at the end of a mold-opening stroke as is well known per se.

In order to accelerate the discharge of the molded articles along their track-forming means, the force of gravity may be supplemented by an airstream trained upon the mold area by an overhead blower. Such a blower could be operated either continuously or, preferably, intermittently in the mold-open position.

BRIEF DESCRIPTION OF THE DRAWING

The above and other features of my invention will now be described in detail with reference to the accompanying drawing in which.

SPECIFIC DESCRIPTION

Figure 1:
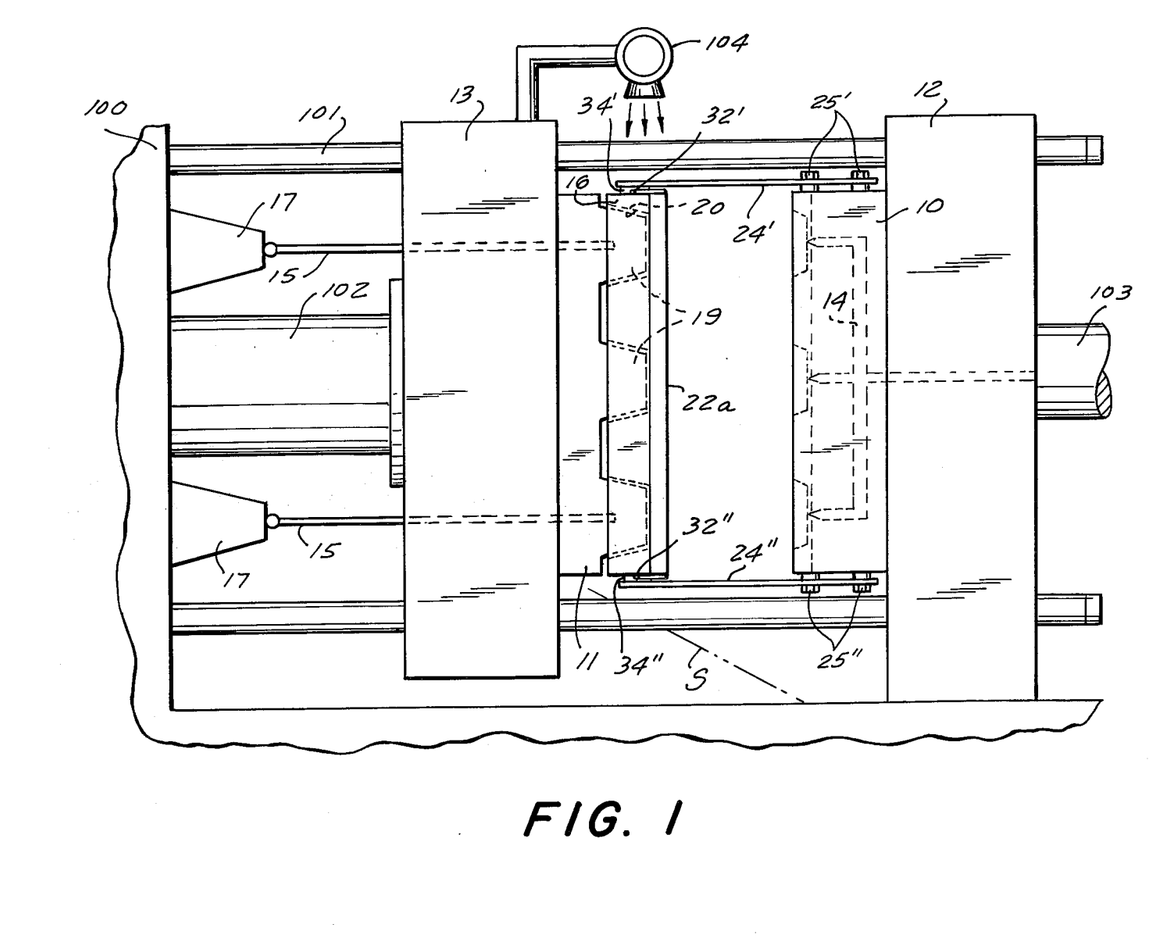
FIG. 1 is a side-elevational view of an otherwise conventional injection-molding machine incorporating my novel ejection-control mechanism, shown with the mold open.
Figure 5:
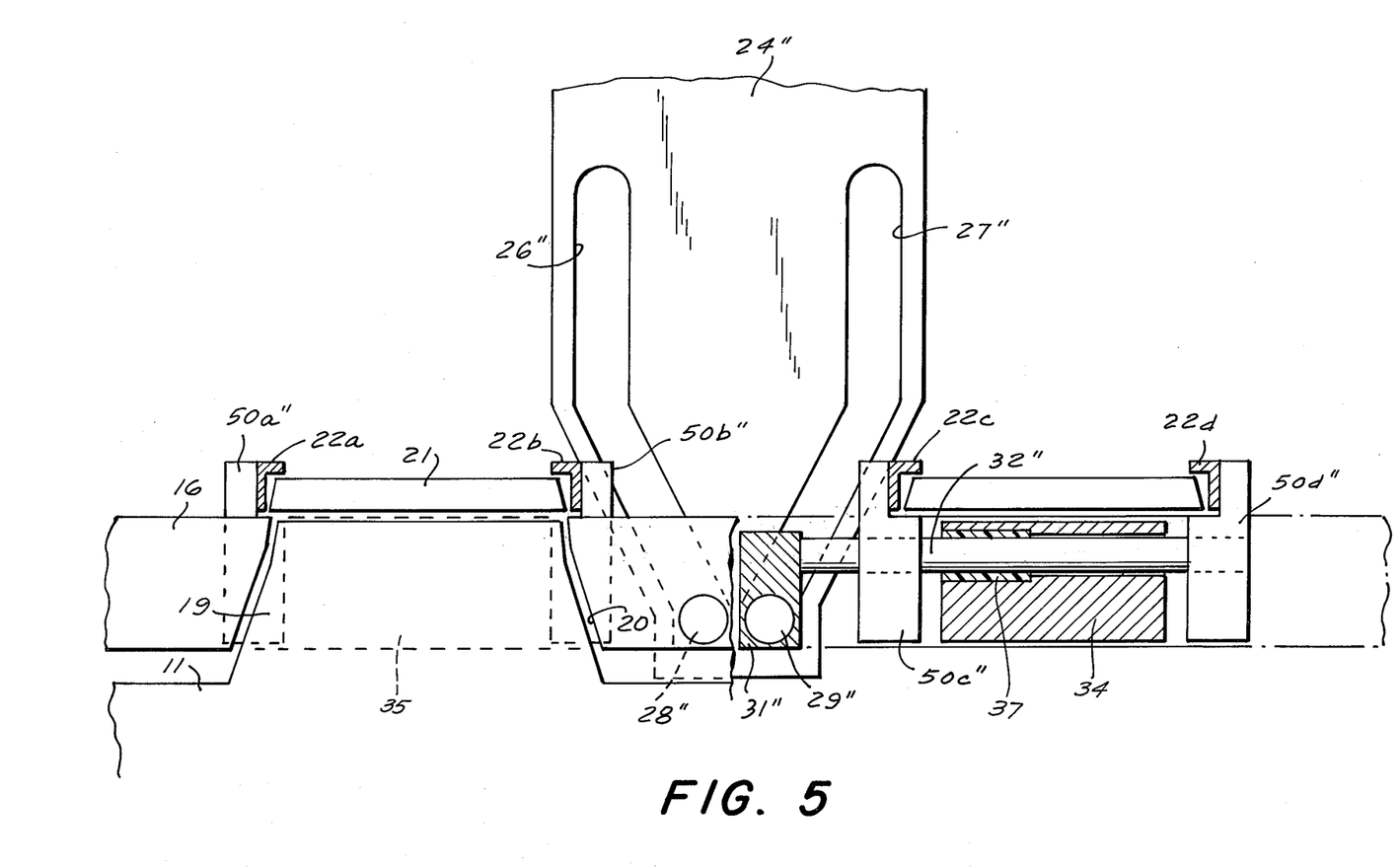
FIG. 5 is a cross-sectional view taken on the line of V — V of FIG. 4.
Figure 7:
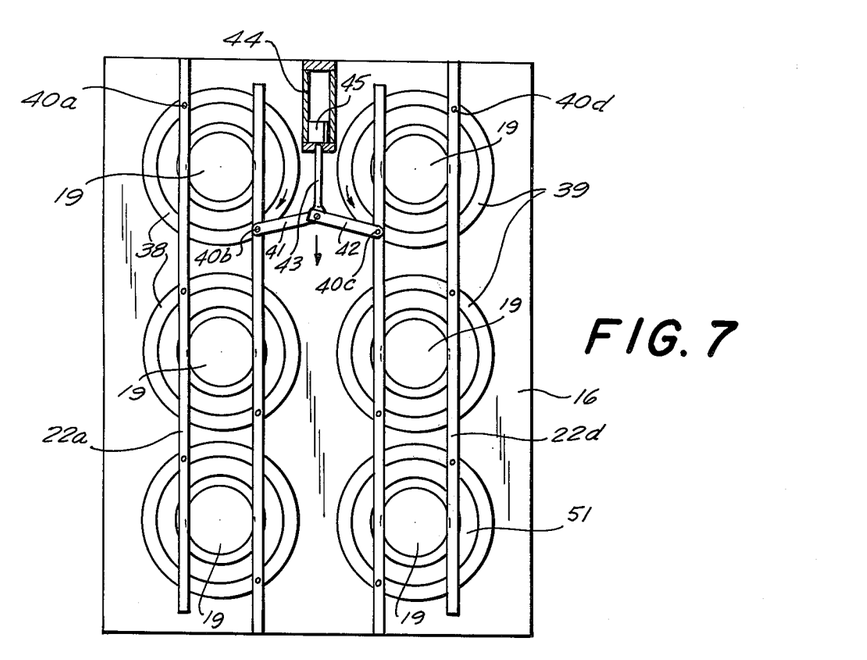
FIG. 7 is a face view of a mold portion provided with an alternate ejection-control system according to my invention, shown in a retracted position thereof.
Figure 8:
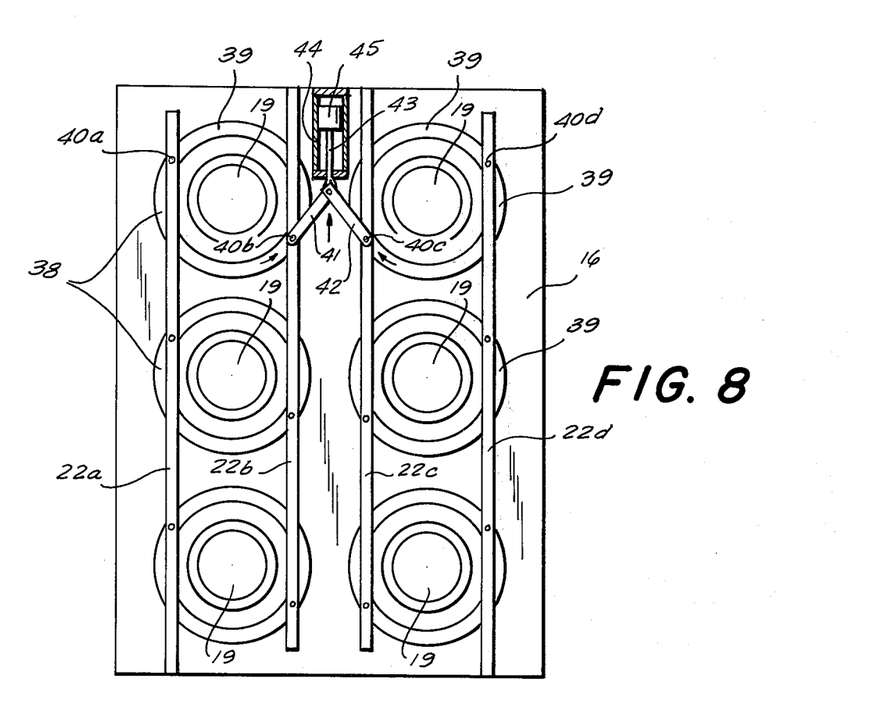
FIG. 8 is a view similar to FIG. 7, showing the mechanism in its operative position.

In FIG. 1 I have shown part of an injection-molding machine including a frame 100, a fixed platen 12 carrying a female mold half 10 and a movable platen 13 carrying a male mold half 11, the latter platen being slidably supported on tie rods 101 and being reciprocable by a ram 102 in a conventional manner not further illustrated. An injection cylinder 103 introduces molten plastic material via sprue channels 14 (e.g. so-called hot runners) into a set of mold cavities, defined by depressions 18 in mold half 10 and cores 19 on mold half 11, when the mold is closed at the end of a rightward stroke of platen 13. Mold half 11 carries a stripper plate 16, slidably mounted thereon with the aid of pins 15, which toward the end of a mold-opening stroke abut respective bosses 17 on frame 100 to separate the stripper plate from the mold portion carrying the cores 19 which pass through apertures 20 in that plate (as best seen in FIG. 5). A molded article 21, in the form of a shallow cup or flanged lid, is thereby dislodged from the core 19 on which it was retained after having been formed in the preceding injection cycle. In the specific embodiment here shown and described, mold half 11 carries six cores 19 passing through respective apertures 20 of stripper plate 16, these cores and apertures forming a rectangular array (as best seen in FIGS. 7 and 8) with two columns of three cores each.

In accordance with my present invention, each column or vertical group of cores 19 is flanked by a pair of vertical rails 22a, 22b on the left and 22c, 22d on the right (as viewed in FIGS. 2 – 8). Thus, rails 22a and 22b constitute a first guide track whereas rails 22c and 22d form a second guide track for controlling the descent of respective articles 21 discharged from the associated cores 19. The rails 22a – 22d are transversely shiftable between a more widely spaced or retracted position, FIG. 2, and a more closely spaced or operative position, FIGS. 3 – 5. In the retracted position, the rails are aligned with recesses 23a, 23b, 23c 23d in the stationary mold half 10 which accommodate these rails to facilitate closure of the mold.

This transverse displacement of the rails is controlled by a camming mechanism comprising a horizontal plate member or tongue 24', fastened by screws 25' to the top of mold half 10, and a similar tongue 24'' fastened by screws 25'' to the bottom of that mold half. The confronting surfaces of tongues 24' and 24'' are provided with pairs of camming grooves 26', 27' and 26'', 27'' engaged by respective cam-follower studs 28', 29' and 28'', 29''. The studs 28', 29' have heads 30', 31' and 30'', 31'' rigid with an upper pair of rods 32', 33' and a lower pair of rods 32'', 33'' which are slidably guided in housings 34', 35' and 34'', 35'' at the top and at the bottom of stripper plate 16. Rods 32', 32'' are fixedly secured to the upper and lower ends, respectively, of the outer rail 22a of the left-hand guide track and of the inner rail 22c of the right-hand guide track; similarly, the rods 33' and 33'' are secured to the upper and lower ends, respectively, of the inner rail 22b of the left-hand guide track and of the outer rail 22d of the right-hand guide track.

Figure 2:
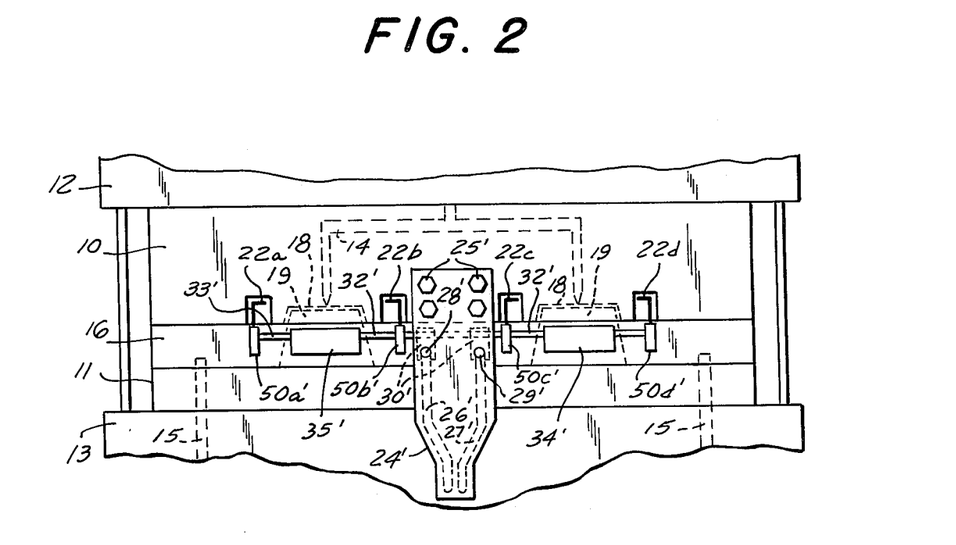
FIGS. 2 and 3 are partial top views of the machine of FIG. 1, showing the mold-closed and the mold-open position, respectively.
Figure 3:
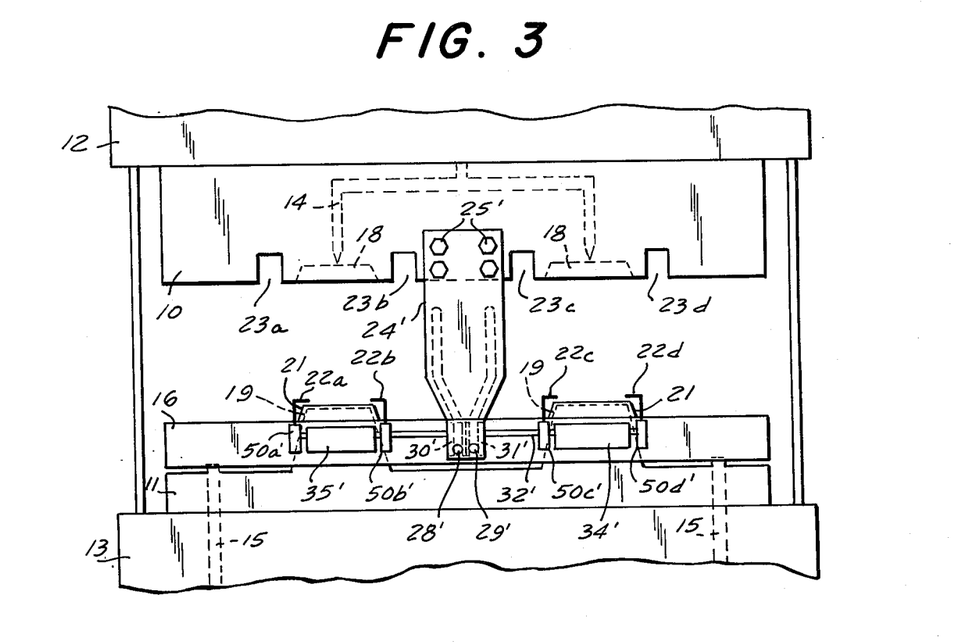
Figure 4:
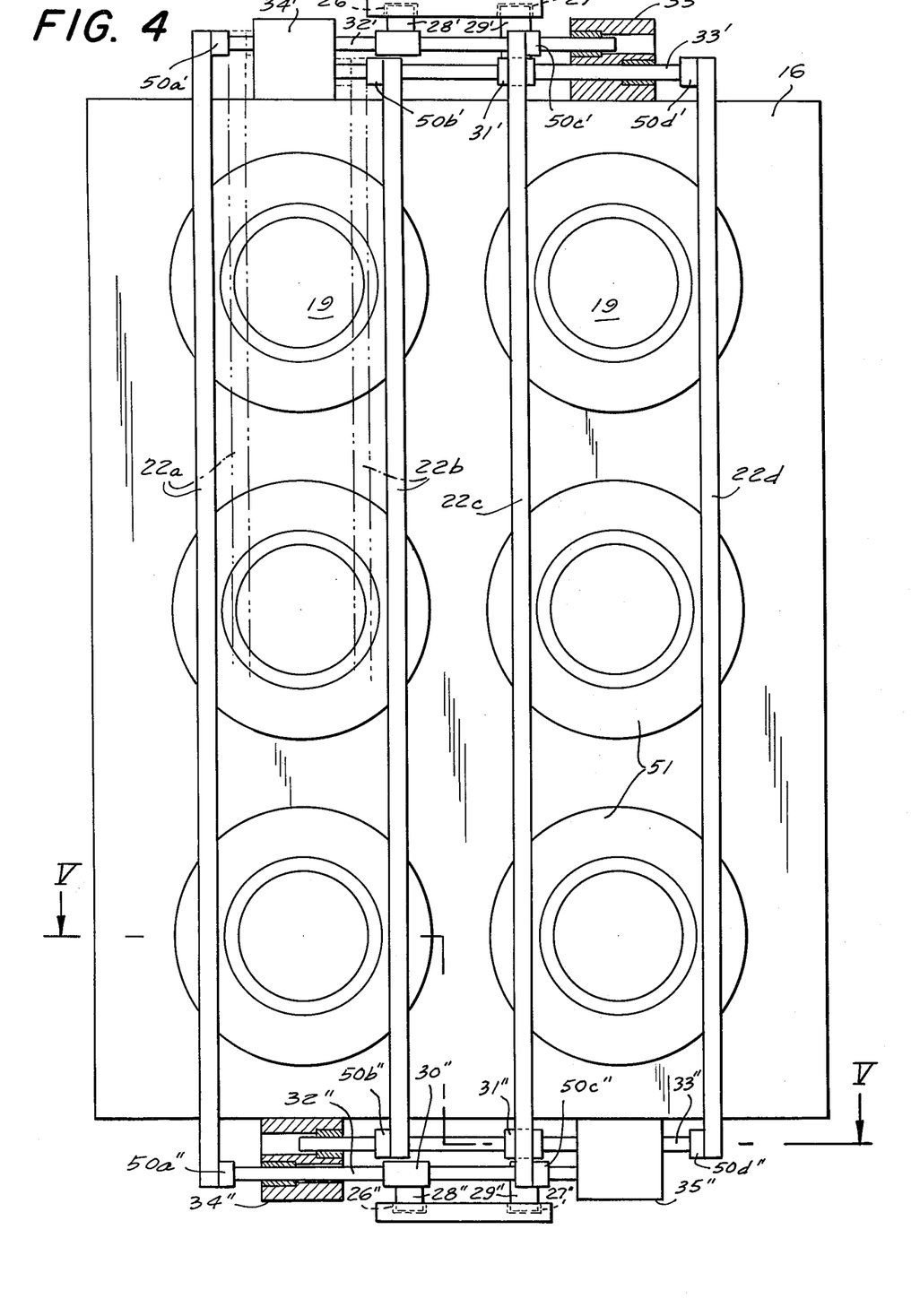
FIG. 4 is a fragmentary face view, drawn to a larger scale, of one of the mold portions of the machine shown in FIGS. 1 – 3.

As clearly seen in FIGS. 2, 3 and 5, the camming grooves 26', 27' of the upper tongue 24' and 26'', 27'' of the lower tongue 24'' converge toward the movable mold half 11 so that the studs 28', 29' and 28'', 29'' are relatively widely separated when the mold is open (FIG. 2) but are closely juxtaposed in the mold-closed position (FIG. 3). In the first instance, the rails 22a – 22d are retracted from the mold cores 19 bracketed thereby so as not to interfere with the injection process; it will be noted that the diverging extremities of the grooves extend parallel to each other for about half the length of these grooves so that the rails reach their retracted position, aligned with their respective recesses 23a – 23d, well before the final phase of the closure stroke. Toward the end of the opening stroke, conversely, the rails have already reached their operative position before the stripper plate 16 separates from the mold portion 11 to start dislodging the articles 21. It will be understood that this stripper plate may be provided with springs, not shown, urging it into contact with its carrier 11 whenever the pins 15 do not abut the bosses 17.

The rails 22a – 22d have the form of angle irons with vertical flanges overlying the rims of cores 19 in their operative position so as to define channels with the surface of plate 16 positively guiding the articles 21 onto a conveyor, chute or other sloping receiving surface S (FIG. 1) disposed underneath the mold halves to receive these articles with a predetermined orientation, e.g. with their closed ends up. The rods 32', 33' and 32'', 33'' are secured to these rails with the aid of blocks 50a', 50b', 50c' 50d' and 50a'', 50b'', 50c'' 50d''.

Figure 6:
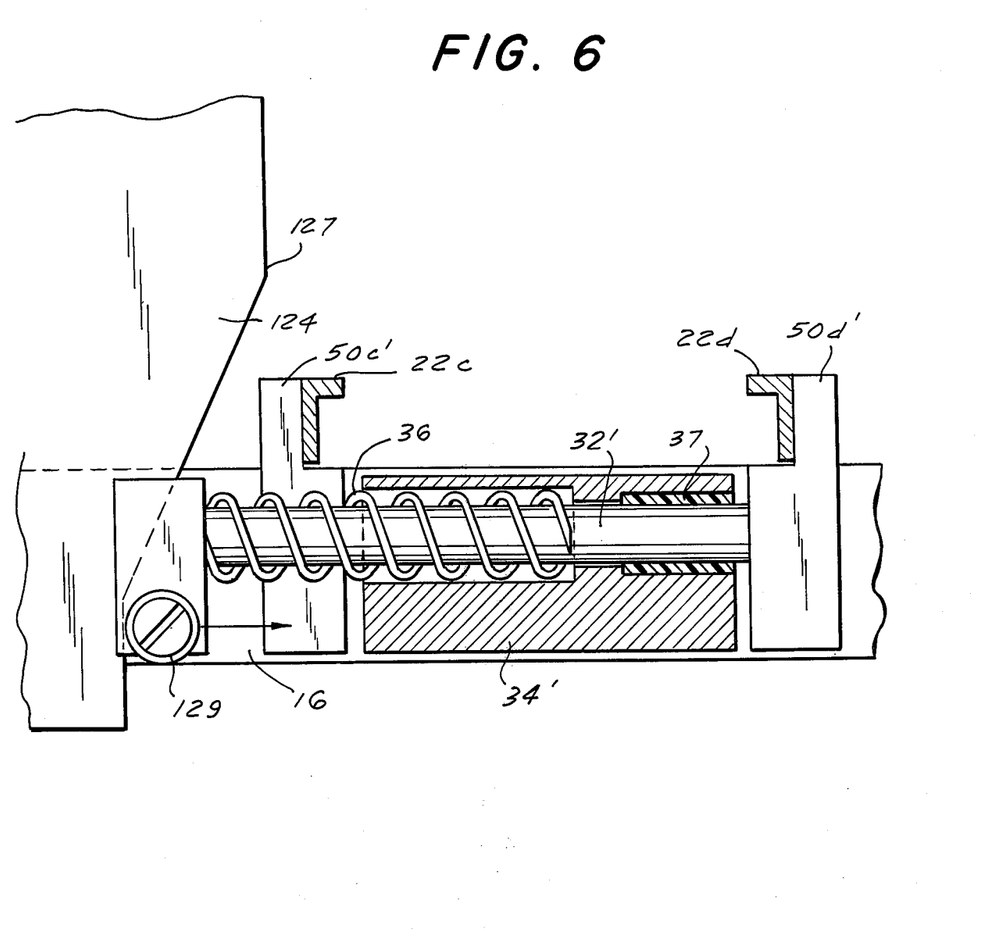
FIG. 6 is a view similar to part of FIG. 5, illustrating a modification.

As illustrated in FIG. 6, the grooved tongues 24', 24'' may be replaced by simplified plate members 124 with beveled edges (e.g. 127) against which the coacting lugs (e.g. 129) are pressed by means of springs 36 surrounding the corresponding rods such as rod 33', the springs 36 being partly received in housings 34', 35' and 34'', 35'' so as to bear upon internal shoulders thereof. A part of each housing, in FIG. 6 as well as in the preceding embodiment, is occupied by a bearing sleeve 37 (e.g. of Teflon) facilitating the sliding of the associated rod.

In FIGS. 7 and 8 I have shown an alternate construction of a control mechanism for the lateral displacement of rails 22a – 22d on stripper plate 16. In this instance, the plate 16 carries two sets of rings 38 (left), 39 (right) coaxially surrounding respective cores 19 and rotatable about the core axes. The three left-hand rings 38 are pivotally connected at 40a to the rail 22a and at a diametrically opposite point 40b to rail 22b; similarly, each right-hand ring 39 is pivotally connected at 40c to the rail 22c and at a diametrically opposite point 40d to rail 22d. The inner rails 22b and 22c are articulated, by way of respective arms 41, 42, to a piston rod 43 of a hydraulic jack 44 whose piston 45 is lowered when the mold opens (FIG. 7) and raised when the mold closes (FIG. 8). The linkage constituted by the four rails 22a – 22d and by the articulated arms 41, 42 causes the rings 38 and 39 to rotate in unison, albeit in opposite directions, when the jack 44 is actuated in timed relationship with the mold drive.

Figure 9:
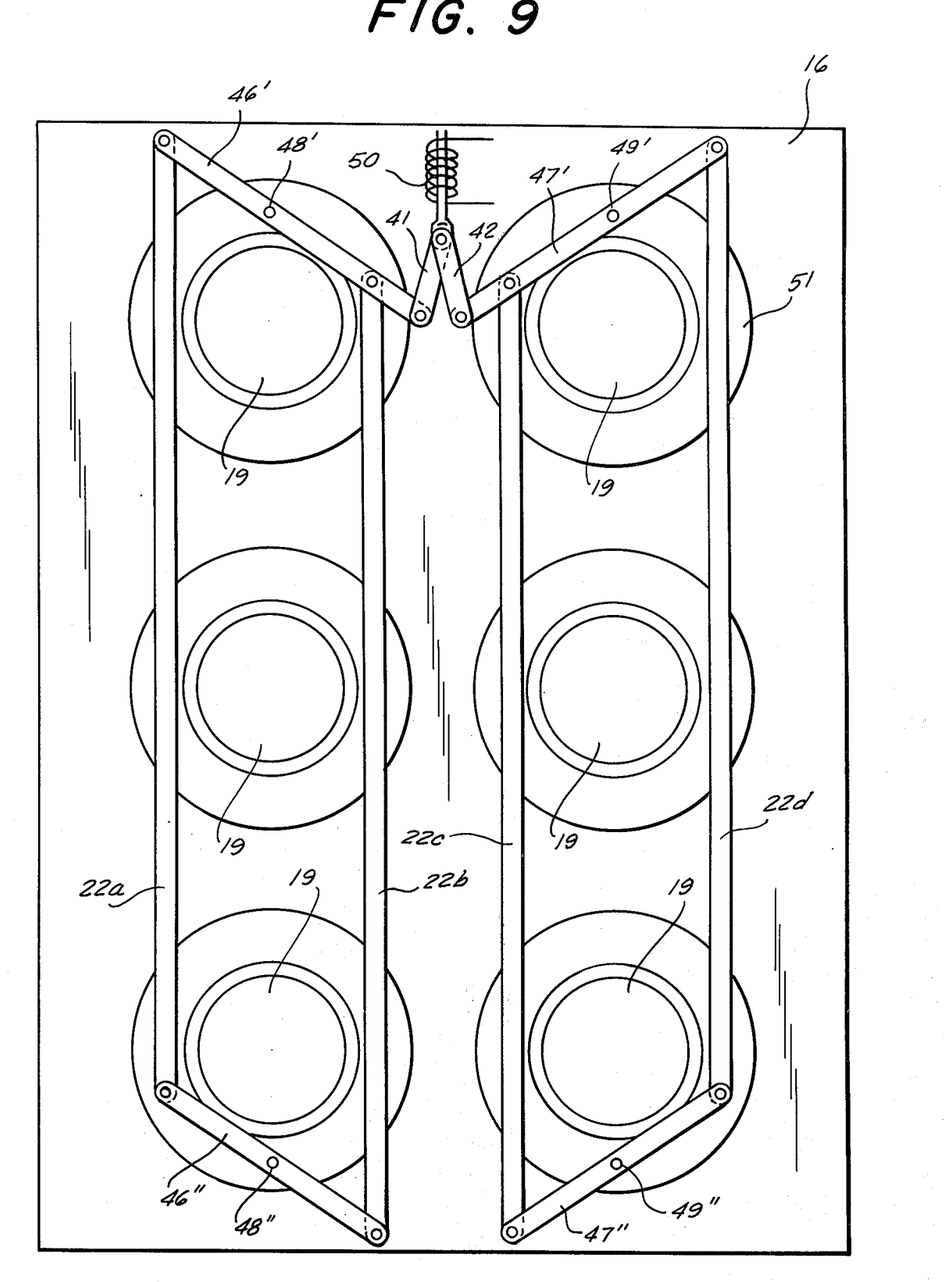
FIG. 9 is a diagrammatic view of a simplified version of the mechanism of FIGS. 7 and 8.

FIG. 9 diagrammatically shows a generally similar arrangement wherein the rings 38, 39 have been replaced by two levers 46', 46'' on the left, articulated to rails 22a and 22b, and a similar pair of levers 47', 47'' on the right, articulated to rails 22c and 22d. These levers are fixedly fulcrumed on stripper plate 16 at 48', 48'' and 49', 49'', respectively; the upper levers 46' and 47' are linked with an actuator 50, here shown as a solenoid, via articulated arms 41 and 42.

It will be apparent that in molds without a stripper plate, in which the molded articles are discharged by other types of ejectors, the rails or equivalent track-forming means may be mounted directly on one of the coacting mold portions to receive the ejected articles therefrom.

An overhead blower 104 has been shown in FIG. 1 as mounted on the movable platen 13 in a position to direct a downward airstream upon the region of the cores 19 in order to accelerate the downward sliding of the molded articles 21 along the tracks 22a, 22b and 22c, 22d when the mold is open. Advantageously, the blower motor is energized intermittently to cause only a brief gust at the instant when the articles 21 are dislodged from the cores 19 by the relative forward movement of stripper plate 16.

The core-receiving apertures 20 are surrounded by stationary annular inserts 51, also known as stripper rings, of more wear-resistant material than the body of plate 16. In FIG. 9 the pivots 48', 48" and 49', 49" are shown mounted on these stripper rings 51.

I claim:

1. In an injection-molding machine including relatively reciprocable first and second mold portions defining at least one cavity, drive means for periodically closing and opening said mold portions, injection means for admitting plastic material into said cavity in a mold-closed position, and ejection means for dislodging a molded article from said cavity in a mold-open position, the combination therewith of a mechanism for guiding molded articles down from said cavity in the mold-open position, said mechanism comprising:

track-forming means on said first mold portion including at least one pair of generally vertical rails extending downwardly from the vicinity of said cavity and bracketing same, said rails being transversely shiftable with relatively wide spacing in a retracted position and relatively close spacing in an operative position; and control means synchronized with said drive means for moving said rails into said operative position during a mold-opening stroke to intercept a molded article and into said retracted position during a mold-closing stroke to facilitate molding of another article.

2. The combination defined in claim 1 wherein said control means comprises coupling means linking said second mold portion with said rails.

3. The combination defined in claim 1 wherein said first mold portion is provided with a mold core defining part of said cavity bracketed by said rails, said second mold portion having recesses aligned with said rails in their retracted position for receiving same in the mold-closed position.

4. The combination defined in claim 1, further comprising blower means operative in mold-open position for directing a downward airstream upon the articles descending along said track-forming means.

5. The combination defined in claim 1 wherein said mold portions define a plurality of cavities arrayed in a pair of parallel columns, said track-forming means comprising two pairs of said rails respectively bracketing said columns.

6. The combination defined in claim 5 wherein said control means comprises a cam member on said second mold portion provided with a pair of camming edges converging toward said first mold portion, a first cam follower linked with one rail of each pair engaging one of said camming edges, and a second cam follower linked with the other rail of each pair engaging the other of said camming edges.

7. The combination defined in claim 5 wherein the rails of each pair are part of a respective parallelogrammatic linkage, said control means comprising an actuator on said first mold portion jointly connected to both articulated linkages.

8. The combination defined in claim 7 wherein said linkages include a set of annular elements rotatably mounted on said first mold portion and articulated at diametrically opposite points to the rails of a respective pair, each of said elements surrounding one of said cavities.

9. The combination defined in claim 5 wherein said first mold portion is provided with a set of mold cores defining part of said cavities, said ejection means comprising a stripper plate supported by said first mold portion and provided with apertures traversed by said cores, said rails being movably mounted on said stripper plate.

* * * * *